(12) United States Patent
Couesnon et al.

(10) Patent No.: US 9,470,812 B2
(45) Date of Patent: Oct. 18, 2016

(54) METHOD AND DEVICE FOR MEASURING SOURCE SIGNATURE

(71) Applicant: CGG SERVICES SA, Massy (FR)

(72) Inventors: Carole Couesnon, Louveciennes (FR); Anne Vesin, Palaiseau (FR)

(73) Assignee: CGG SERVICES SA, Massy (FR)

( * ) Notice: Subject to any disclaimer, the term of this patent is extended or adjusted under 35 U.S.C. 154(b) by 295 days.

(21) Appl. No.: 14/157,952

(22) Filed: Jan. 17, 2014

(65) Prior Publication Data

US 2015/0168577 A1    Jun. 18, 2015

(30) Foreign Application Priority Data

Dec. 17, 2013    (FR) ...................... 13 62766

(51) Int. Cl.
*G01V 1/38* (2006.01)

(52) U.S. Cl.
CPC .................. *G01V 1/3808* (2013.01)

(58) Field of Classification Search
CPC .................................. G01V 1/3808
USPC ..................................... 367/16, 23
See application file for complete search history.

(56) References Cited

U.S. PATENT DOCUMENTS

| | | | | |
|---|---|---|---|---|
| 4,725,950 A | * | 2/1988 | Woods ................ | H03G 3/3026 367/21 |
| 5,894,450 A | * | 4/1999 | Schmidt ................ | H04B 13/02 367/131 |
| 6,018,494 A | * | 1/2000 | Laws ..................... | G01V 1/006 181/110 |
| 2013/0083624 A1 | | 4/2013 | Brizard et al. | |

FOREIGN PATENT DOCUMENTS

EP    2322955 A2  *  5/2011    ............ G01V 1/006

OTHER PUBLICATIONS

Kinsey et al., "Assessing the Deepwater Horizon Oil Spill with the Sentry Autonomous Underwater Vehicle," 2011 IEEE/RSJ International Conference on Intelligent Robots and Systems, Sep. 25-30, 2011, San Francisco, CA, USA, 7 pp.*
GAPS, Portable, Pre Calibrated USBL, Technical Specifications, Feb. 2012 (http://www.ixsea.com/en/subsea_positioning/1/pags.html).
HiPAP 500, High Precision Acoustic Positioning System, Systems features and Technical specifications, Oct. 2003 (http://www.km.kongsberg.com/ks/web/nokbg0240.nsf/AllWeb/FF57C18363FAD917C1256A7E002B9F2F? OpenDocument).

* cited by examiner

*Primary Examiner* — Daniel L Murphy
(74) *Attorney, Agent, or Firm* — Patent Portfolio Builders PLLC

(57) ABSTRACT

Source signature of a source array is measured using an autonomous underwater vehicle which is not physically connected to surface equipment and uses acoustic signals for communication and/or location. Such measurements may be performed while the source array is towed, the AUV then moving in tandem with the source array.

20 Claims, 11 Drawing Sheets

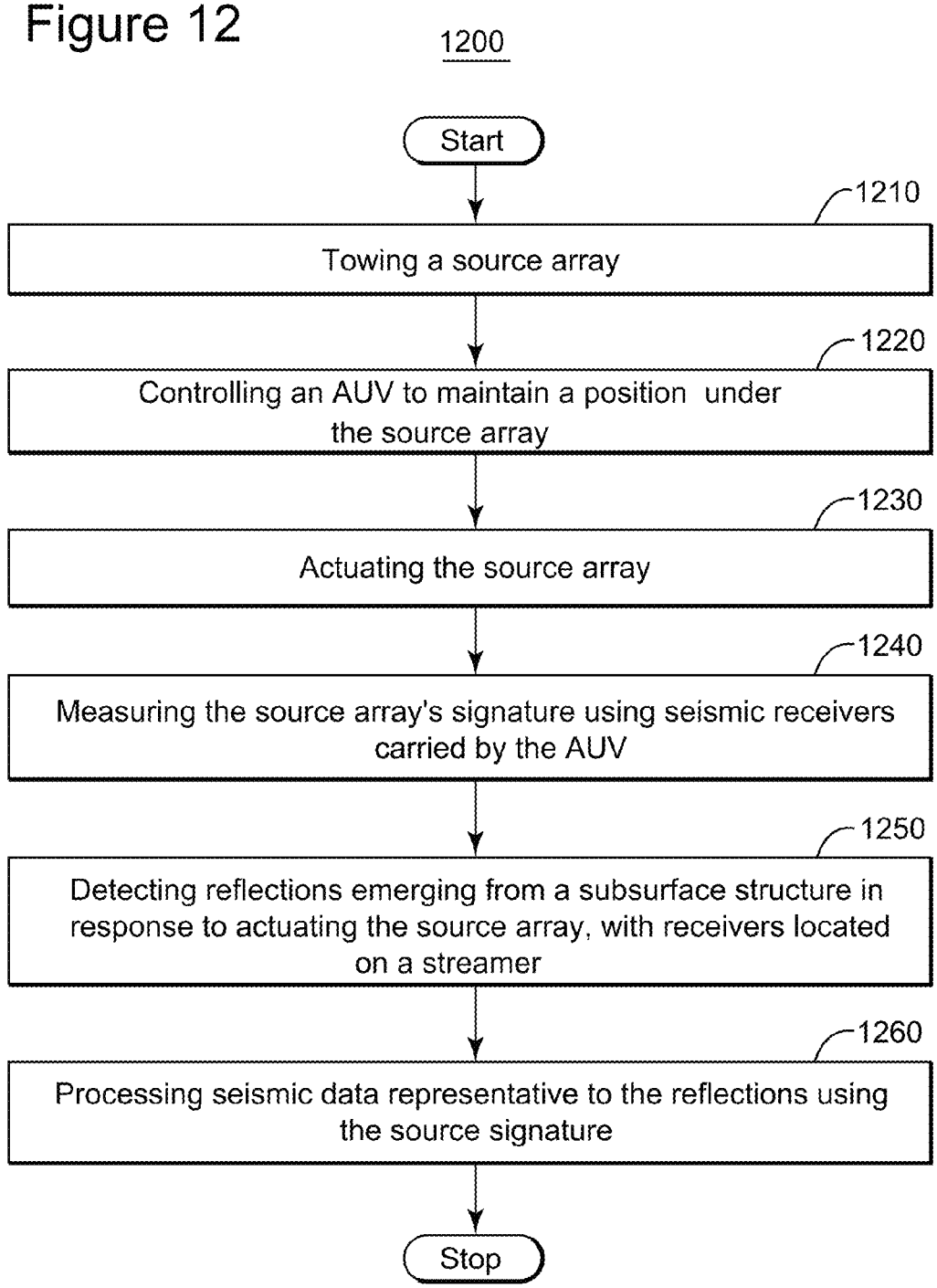

METHOD AND DEVICE FOR MEASURING SOURCE SIGNATURE

BACKGROUND

1. Technical Field

Embodiments of the subject matter disclosed herein generally relate to methods and systems and, more particularly, to mechanisms and techniques for measuring a source signature.

2. Discussion of the Background

In seismic surveys used in the gas and oil industry to investigate underground structures, one or more individual seismic sources are actuated to emit seismic waves propagating downward through the investigated structure, where the seismic waves are reflected by geological interfaces that act as partial reflectors. The reflected seismic waves are detected by sensors (generally referred to as "receivers") recording seismic data, which is processed and converted into structural information.

When individual seismic sources are actuated according to an actuation sequence, they emit seismic waves over a defined period of time (in the range of a fraction of a second to a few seconds) within a known range of frequencies (e.g., 10-150 Hz). The emitted amplitude is frequency-dependent. Close to the individual sources (i.e., near-field), the amplitude-versus-frequency shape varies as the seismic waves propagate spatially. However, far from the individual sources (far-field), the amplitude-versus-frequency shape ceases to vary as the seismic energy propagates spatially, and the amplitude decreases inversely proportional to the distance from the individual sources. The substantially constant amplitude-versus-frequency shape far enough from the individual sources is known as the source signature. Note that while the source signature is a two-dimensional amplitude-versus-frequency shape for impulse-type seismic sources (e.g., air-guns), it has an additional time dimension for seismic sources emitting energy during a longer period (e.g., vibrating sources). An arrangement of plural individual seismic sources is known as source array.

Knowledge of the source signature is desirable to better identify geological features when seismic data is processed. In mathematical terms, seismic data collected by a seismic receiver is a convolution of the source signature and the underground structure's response to the seismic waves emitted by the source. The more accurate the knowledge of the source signature, the more accurately the underground structure's response may be recovered from the acquired seismic data to generate an image thereof.

The source signature depends on characteristics of individual sources (e.g., type, volume, initial individual amplitude, etc.), their geometrical arrangement (e.g., inline distances between the individual sources in a seismic sub-array, distance between the sub-arrays, depths of the individual sources, etc.), the actuation sequence of the individual sources, and environmental conditions (e.g., weather, currents, etc.). Some of these parameters, such as the characteristics of individual sources or the actuation sequence, can be reliably reproduced from shot to shot. Some other parameters, such as environmental conditions, the geometrical arrangement, or the sources' operational states, may result in unpredictable and unavoidable variations. Thus, the source signature may vary from shot to shot.

Conventionally, as illustrated in FIG. 1, a vessel 110 tows (in T direction) one or more hydrophones 120 at more than 100 m under a source array 130 to measure the source signature. Source array 130 and hydrophones 120 may easily drift laterally relative to one another, compromising detection of the direct waves from the source array. Additionally, towing hydrophones in this manner is challenging due to the relatively great towing depth and the risk of the cable connecting the hydrophones to the vessel tangling.

Another conventional method for detecting a source signature employs the setup illustrated in FIG. 2 (a bird's-eye view). A buoy with hydrophones attached is maintained in a stationary position under point 210, at about 100 m deeper than the source array's towing depth. A vessel 220 tows a source array 230 on trajectory 240 to bring the source array 230 above the hydrophones. Towed source array 230 is actuated when above the hydrophones so that the hydrophones detect the seismic waves traveling directly from the source array to the hydrophones. This method is time-consuming and cumbersome because it is difficult to fire the source array 230 exactly vertical above the hydrophones, which may drift. Although the method illustrated in FIG. 2 provides a direct measurement of the source signature, the method is not usable during regular seismic data acquisition.

Another conventional method estimates the source signature shot-by-shot based on a model starting from the directly-measured source signature and using near-field measurements of the emitted seismic waves. The near-field measurements are acquired using near-field sensors placed in proximity to each of the individual sources. The main disadvantage of this approach is that during direct measurement, the source array and seismic detectors may easily drift apart from one another causing unreliable detection. This problem is so prevalent that software simulations are preferred to the estimates of the source signature. However, a simulated result is only as good as the phenomenological model implemented in the software.

In the context of a complex reality and increasing variety of individual source arrays, it would be desirable to provide devices, systems, and methods that reliably measure a source signature shot-by-shot while acquiring seismic data.

SUMMARY

In some embodiments, the source signature of a source array is measured using receivers located on an autonomous underwater vehicle (AUV) positioned under the source and moving in tandem with the source.

According to one embodiment, there is a method for acquiring a source signature of a towed source array. The method includes deploying an AUV and controlling the AUV to maintain a position under the towed source array. The method further includes detecting seismic waves emitted by the towed source array using seismic receivers carried by the AUV. The method then includes extracting the source signature based on the detected seismic waves.

According to another embodiment, there is a seismic data acquisition method that includes towing a source array, controlling an AUV to maintain a position under the source array, actuating the source array, measuring a source signature of the source array using seismic receivers carried by the AUV, and detecting reflections emerging from a subsurface structure in response to actuating the source array, with receivers located on a streamer.

According to another embodiment, there is a method for acquiring a source signature of a source array that includes deploying an AUV that uses acoustic signals to maintain a position under the source array, and extracting a source signature of the source array based on measurements acquired by one or more seismic receivers carried by the AUV.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 12 is a flowchart of a seismic data acquisition method according to an embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The embodiments described in this section are related to measuring a source signature using an autonomous underwater vehicle (AUV). The embodiments are usable during seismic data acquisition and for investigating source signature directivity.

Reference throughout the specification to "one embodiment" or "an embodiment" means that a particular feature, structure, or characteristic described in connection with an embodiment is included in at least one embodiment of the subject matter disclosed. Thus, the appearance of phrases "in one embodiment" or "in an embodiment" in various places throughout the specification is not necessarily referring to the same embodiment. Further, the particular features, structures, or characteristics may be combined in any suitable manner in one or more embodiments.

According to various embodiments described in this document, a source signature is measured using receivers carried by an AUV at a predetermined depth under a towed source array. The term "AUV" should not be construed restrictively; it also covers drones or remote operated vehicles configured to move underwater without being towed ("free-swimming"). To position itself at the predetermined depth under a towed source array, the AUV may use acoustic signals.

Figure 3:
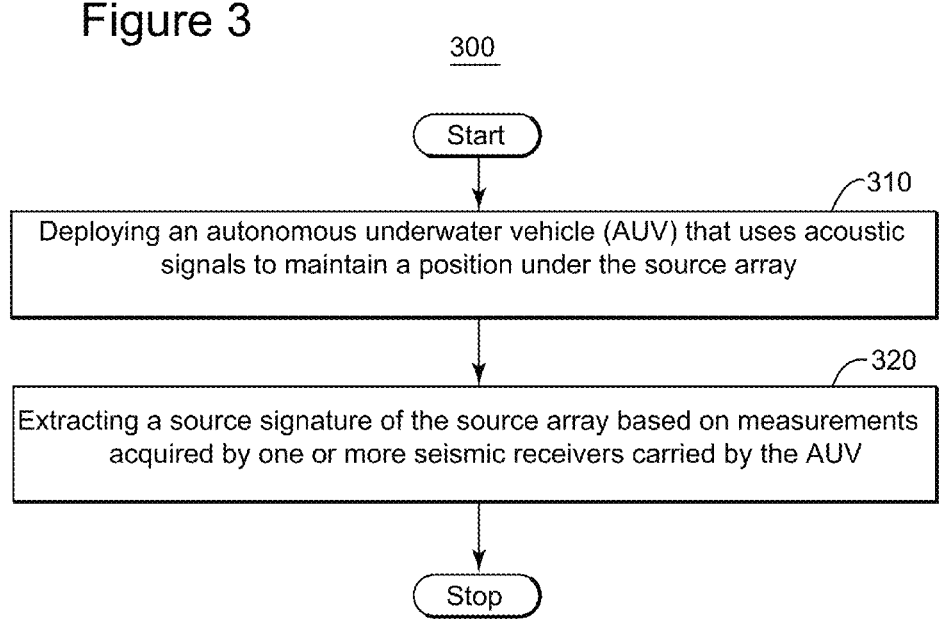
FIG. 3 is a flowchart of a method for acquiring a source signature of a source array according to an embodiment.

FIG. 3 is flowchart of a method 300 for acquiring a source signature according to an embodiment. Method 300 includes deploying an AUV that uses acoustic signals to maintain a position under the source array at 310. Method 300 includes deploying an AUV that uses acoustic signals to maintain a position under the source array at 310. The position may be defined to encompass various scenarios, e.g., at a substantially (i.e., as close and continuously as achievable) constant depth (e.g., about 200 m) vertically under the source array, or a depth equal to or deeper than a predetermined depth (e.g., more 200 m) vertically under the source array or along the source array's trajectory, within a predetermined distance (e.g., 250 m) from the source array. Since the source array is not stationary, the AUV moves to follow the source array's trajectory. Since the source array is not stationary, the AUV moves to follow the source array's trajectory. However, the AUV is not connected to a surface vessel by cables. Method 300 further includes extracting the source signature based on measurements acquired by seismic receivers carried by the AUV at 320.

AUVs are free-swimming underwater vehicles (without towing cables) characterized by great maneuverability and high stabilization accuracy. Many uses for AUVs have been found in marine oil and gas exploration and exploitation for seabed mapping, geophysical site inspection, pipeline and subsea structure inspection, oceanographic surveys, etc. Recently, acoustic communication between an AUV and other equipment via water has become substantially more efficient. This development has opened a new realm of possibilities in using AUVs for various underwater missions during which the AUV can transmit real-time data to a data hub at the water surface (e.g., a computer located on a vessel). The better acoustic communication also enables the AUV to achieve more accurate positioning.

Figure 4:
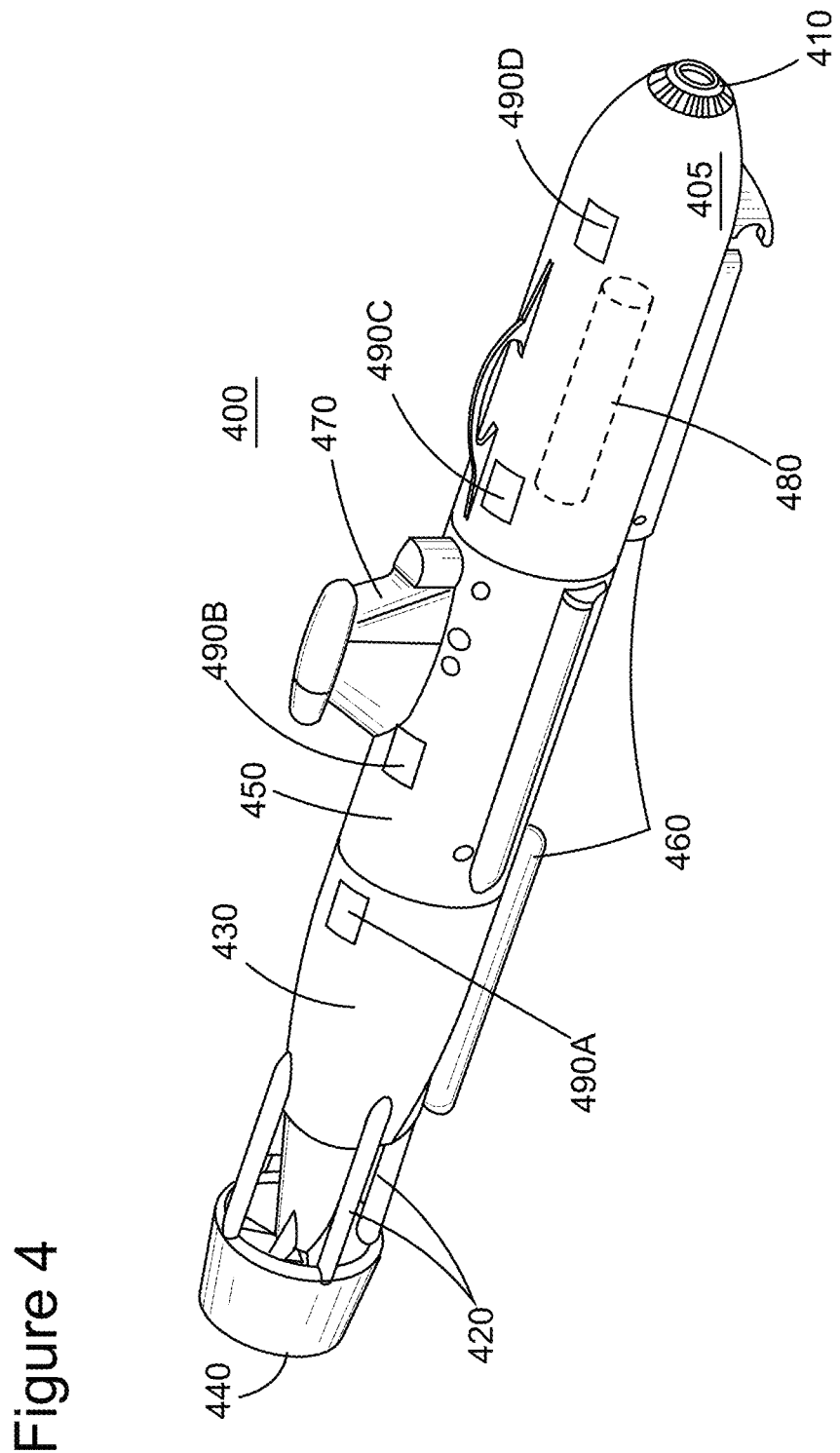
FIG. 4 is schematic representation of an autonomous underwater vehicle (AUV) according to an embodiment.

As illustrated in FIG. 4, an AUV 400 has a hydrodynamic body 405 with a nose 410 in front and wings 420 in the back. AUV 400 includes a battery 430 supplying energy to an engine 440 that propels the AUV. Additionally or alternatively to the battery, the AUV may include a self-power system that uses, for example, tidal energy. AUV 400 further includes a controller 450 controlling engine 440 and steering mechanisms such as steering surfaces 460 attached underneath the body. Controller 450 adjusts the AUV's trajectory, using the steering mechanisms, based on information acquired or received acoustically or using other known forms of communication. For example, mast 470 may host acoustic communication and/or positioning equipment as discussed later.

AUV 400 carries a payload of sensors, including one or more seismic receivers 490A-D configured to detect direct seismic waves arriving from a source array. The numbers and location of the seismic receivers in FIG. 4 are illustrative and not limitations. For example, the seismic receivers may be hydrophones.

Figure 5:
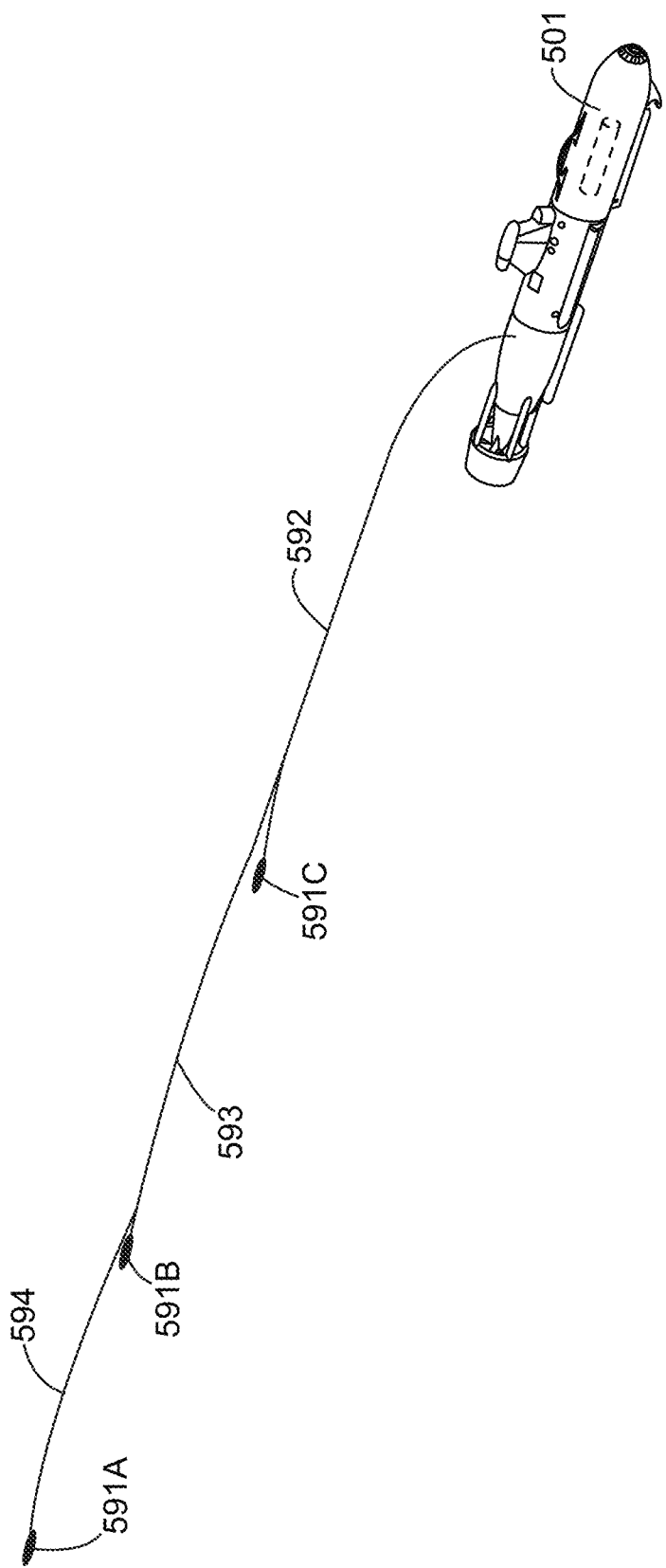
FIG. 5 is schematic representation of an autonomous underwater vehicle (AUV) according to another embodiment.

As illustrated in FIG. 5, instead of being mounted on the AUV's body as in FIG. 4, the seismic receivers 591A, 591B, and 591C may be attached to the AUV 501 by cables 592, 593, and 594 extending up to 5 m length to avoid the receivers being affected by mechanical noise due to the AUV's operation.

A data processing device 480 (shown in FIG. 4) connected to the receivers may be housed inside AUV's body 405. The data processing device may assist the receivers in converting the detected seismic waves into digital data and may include a data storage device (e.g., a memory) to store the digital data. In one embodiment, the data-processing device may be configured to determine the source signature based on the digital data. In addition to, or instead of, the digital data, the source signature may be stored in the data storage device. Data processing device 480 may be included in controller 450.

The AUV's size is dependent on a target operation depth, the payload carried, etc. As an example, an AUV used to measure a source signature and moving at a few hundred meters depth may have a length of about 2 m, a diameter of about 200 mm and a weight of about 50 kg. The AUV may have slightly positive buoyancy to rise to the water surface in the event of engine failure. The AUV may also be equipped to send an emergency signal in such a situation.

Figure 6:
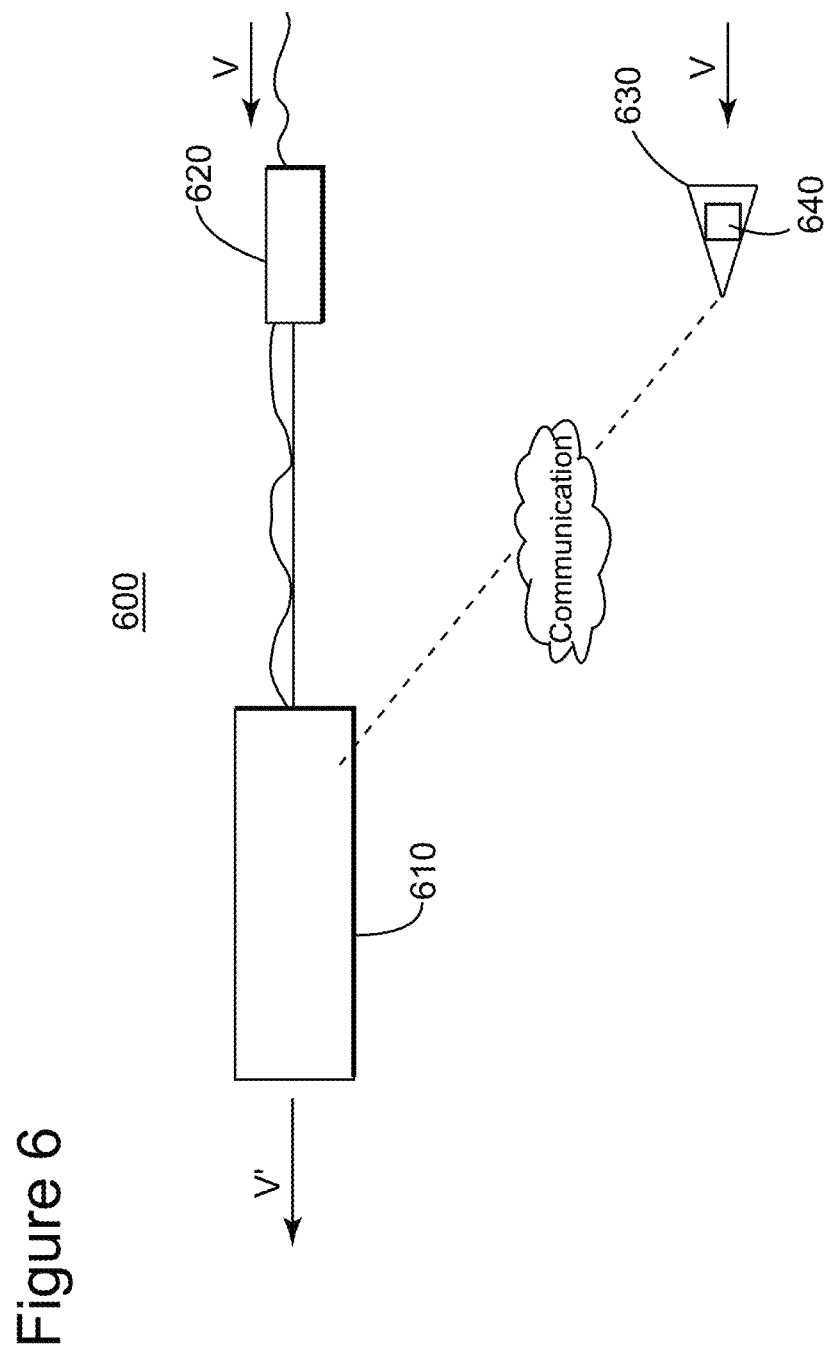
FIG. 6 illustrates a source signature measurement system according to an embodiment.

FIG. 6 illustrates a source signature measurement system 600 usable shot-by-shot while acquiring seismic data. A vessel 610 tows a source array 620. An AUV 630 uses acoustic signals to communicate with an acoustic transceiver that may be attached underwater to vessel 610 to maintain a position at a predetermined depth (e.g., about 200 m) under source 620. Thus, since source 620 moves with a velocity v (e.g., a towing velocity of about 4.5 knots), AUV 630 moves in tandem with the source at the same velocity.

FIG. 6 indicates that AUV 630 exchanges acoustic signals with vessel 610 but in another embodiment the AUV communicates with another vessel nearby (i.e., a "chase" vessel, not shown). An acoustic modem 640 may be provided on the AUV and/or vessels when necessary to convert acoustic signals into electrical signals and vice-versa. The acoustic signals may transfer information related to the detected seismic waves in analog or digital form.

AUV 630 may be positioned using an acoustic positioning system to maintain its position under the center of source array 620. For example, the acoustic positioning system may be an ultra-short baseline (USBL) system as described below.

In one embodiment, vessel 610 has an attached transceiver that emits an acoustic pulse detected by a transponder mounted on AUV 630. In another embodiment, the transceiver may be attached to a float towed by the vessel or mounted on another vessel ("chase boat").

The transponder then emits a reply acoustic pulse, which is detected by the transceiver. The distance between the transceiver and the transponder can be estimated at the vessel from the time interval between emission of the initial pulse and reception of the reply pulse. An angle of the incoming reply pulse may be detected, for example, using three or more physically separated transducers (e.g., at about 10 cm from one another) which are parts of the transceiver. Upon determining the AUV's current position (i.e., angle and distance to the vessel to the AUV), the vessel may send position-related acoustic signals (e.g., commands for adjusting the AUV's trajectory or the source and AUV's coordinates) to the AUV, making it possible for the AUV to maintain its position under the source.

In another embodiment, AUV 630 has a transponder that emits an acoustic pulse detected by a transceiver attached to vessel 610. The distance from the AUV to the vessel can then be estimated at the AUV in the same manner as described above, based on duration and direction of an exchange of acoustic signals. In yet another embodiment, the transponder may be mounted in the center of source array 620 instead of being mounted on the vessel. Thus, the source array's and the AUV's locations are monitored to enable guiding the AUV to maintain its position under the source.

Figure 7:
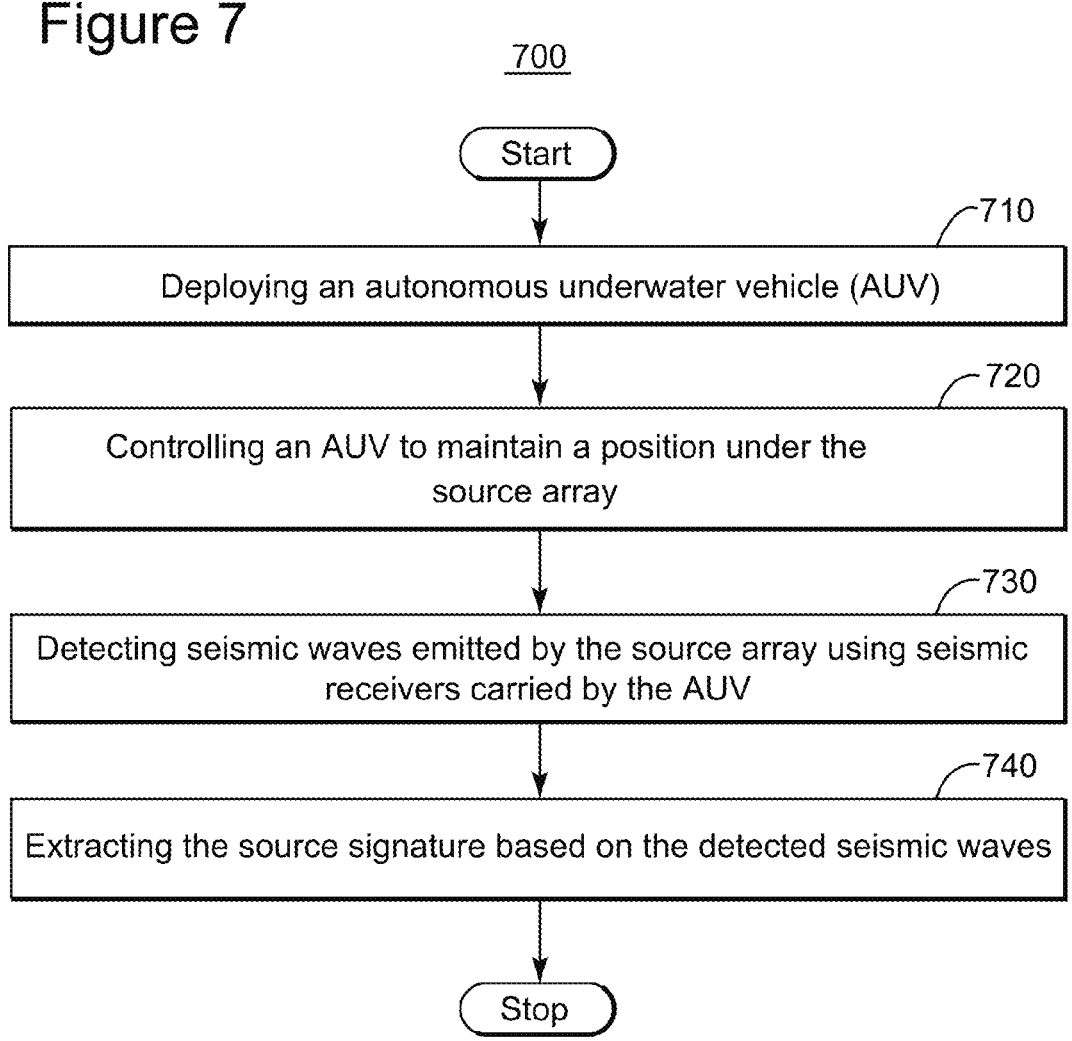
FIG. 7 is a flowchart of a method for acquiring a source signature of a source array according to another embodiment.

Controller 640 of AUV 630 is configured to take trajectory-correcting actions as necessary. FIG. 7 is a flowchart of a method 700 for acquiring a source signature of a source array according to another embodiment. Method 700 includes deploying the AUV at 710. An AUV launching/retrieval system may be located on the vessel towing the source array or on another vessel. Method 700 further includes controlling the AUV to maintain a position (at a predetermined depth) under the towed source array at 720. The AUV may be guided using acoustic signals. Method 700 then includes detecting seismic waves emitted by the source array using seismic receivers carried by the AUV at 730. The method further includes extracting the source signature based on the detected seismic waves at 740.

Method 700 may further include converting the detected seismic waves into digital data. In one embodiment, this digital data and/or the source signature are stored on a data storage device located on the AUV. In another embodiment, the digital data and/or the source signature are transmitted acoustically via water to a data hub located on a vessel (the vessel towing the source array or another vessel).

Method 700 may include receiving position-related acoustic signals from a vessel when the AUV's position is determined at the vessel. The position-related signals may be commands for steering the AUV, or may convey the AUV's position and/or the source array's position to enable the AUV's controller to adjust the AUV's trajectory, if necessary. Method 700 may include determining the AUV's position relative to the source array's position at the AUV. Using steps 720-740 of method 700, the source signature may be determined multiple times while a seismic survey using the source array is performed. In one embodiment, the source signature is determined every time the source array is activated (i.e., shot-by-shot).

Figure 8:
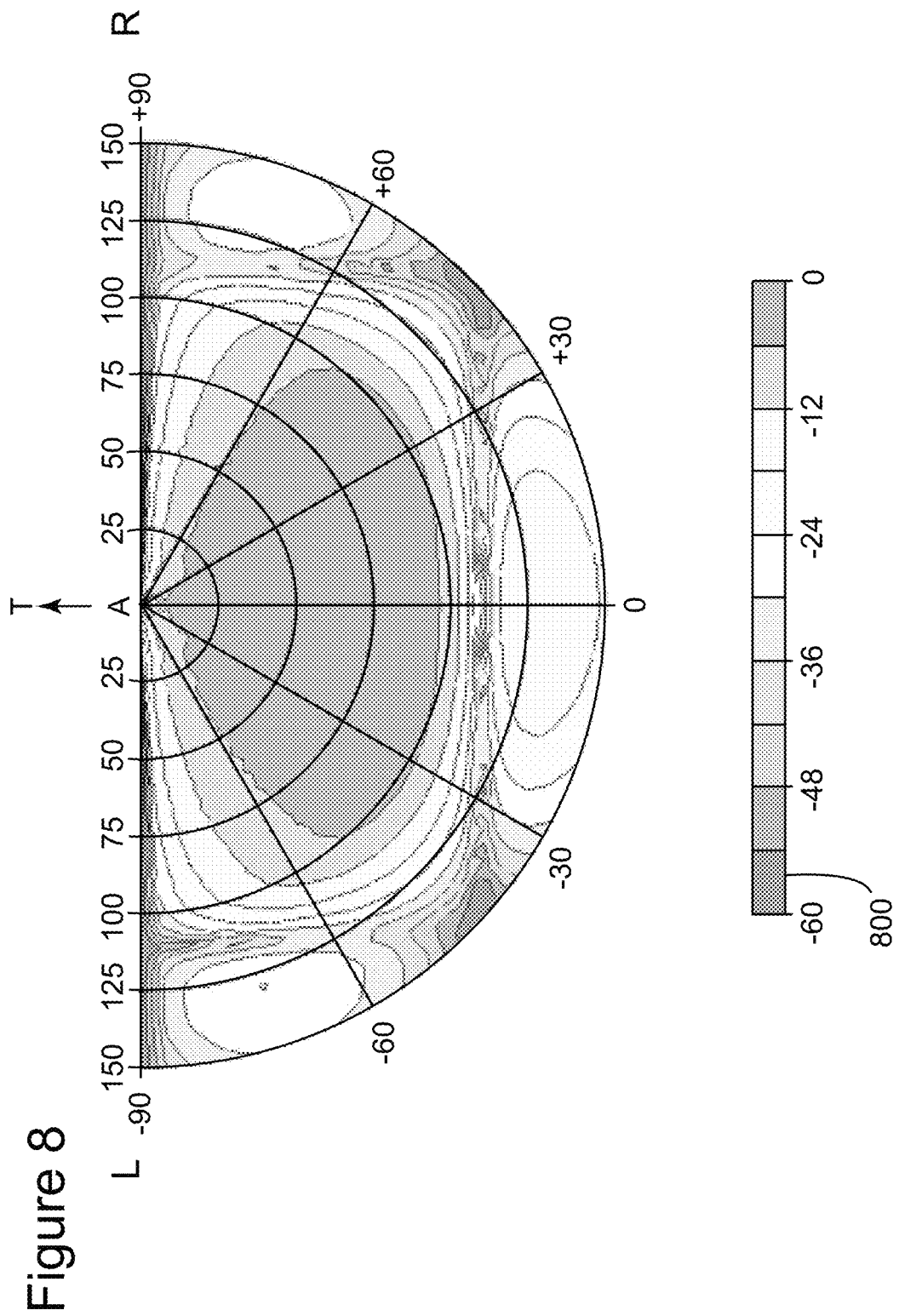
FIG. 8 is a graph illustrating source signature's dependence on azimuth angle.

The measurement setup in FIG. 6 may also be used to measure source signature directivity (i.e., source signature's dependence on the azimuth angle). While such a measurement cannot be performed shot-by-shot, knowledge of source signature directivity is important because different receivers receive waves corresponding to different azimuth angles and thus are characterized by different source signatures. The azimuth angle is the angle from a tow axis to a line between the shot location and a receiver location. FIG. 8 is a two-dimensional graphic illustration of the source signature variation with the azimuth angle. Point A is a shot position while the towing vessel moves in direction T; L and R indicate left and right of (a vertical plane including) the towing direction T. The various half-circles around point A are reference lines for frequencies of 25, 50, . . . , 150 Hz. The various shades of gray correspond to different amplitudes (band 800 illustrates the correlation between the shades of gray and normalized amplitudes in dB). The azimuth angle varies between −90° and 90° around the circumference of this graph.

Figure 9:
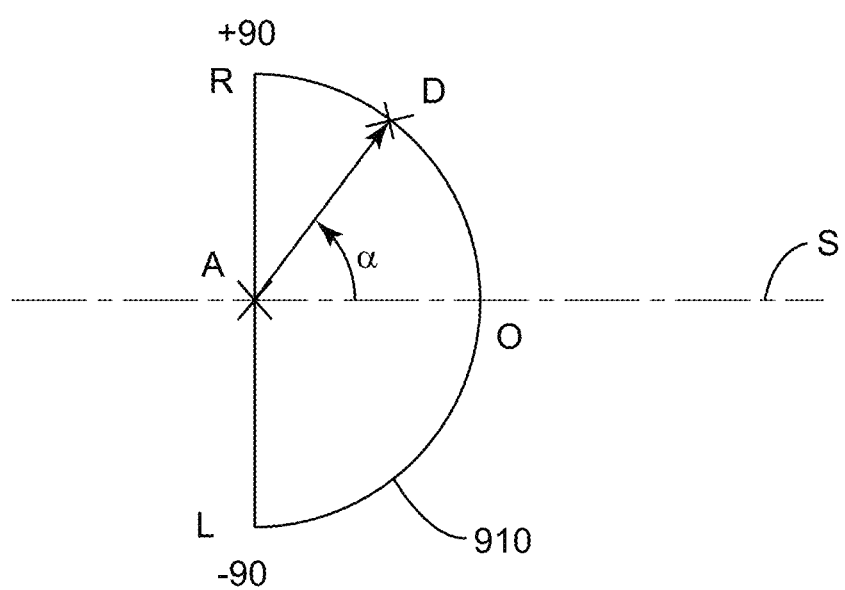
FIG. 9 illustrates a loop performed by the AUV according to an embodiment.

To measure the source signature's directivity, as illustrated in FIG. 9, the method may further include steering the AUV to perform a loop 910 in a substantially horizontal plane relative to shot locations O of the source array. The AUV successively detects the source signature at various azimuth angles. For example, when the AUV is located in position D relative to a shot location O as illustrated in FIG. 9, it measures the source signature corresponding to azimuth angle α. The source array and the AUV then move in the towing direction such that when the source array is fired, the AUV is positioned at another azimuth angle on the loop 910. The loop is characterized by a horizontal distance between the AUV and shot locations (i.e., DA in FIG. 9) in a range of 300-500 m. Such a loop may be performed periodically or may be triggered by a change in conditions (e.g., one of the individual sources stops working) while a survey is performed.

Figure 10:
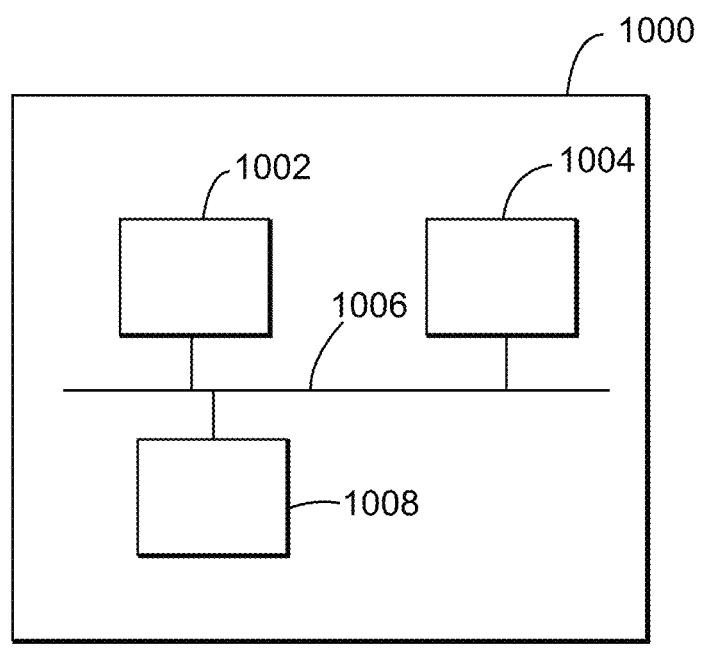
FIG. 10 illustrates the structure of a controller according to an embodiment.

Computing the source signature based on detected seismic waves and guiding the AUV may be performed by a controller (e.g., 450 in FIG. 4A). The structure of such a controller 1000 is illustrated in FIG. 10. Controller 1000 includes a processor 1002 and a storage device 1004 that communicate together via a bus 1006. An input/output interface 1008 connected the bus 1006 and including an acoustic modem enables the processor and/or the memory to communicate, for example, with the vessel and/or the source. Controller 1000 may be a computer, a server, a processor or dedicated circuitry.

Figure 11:
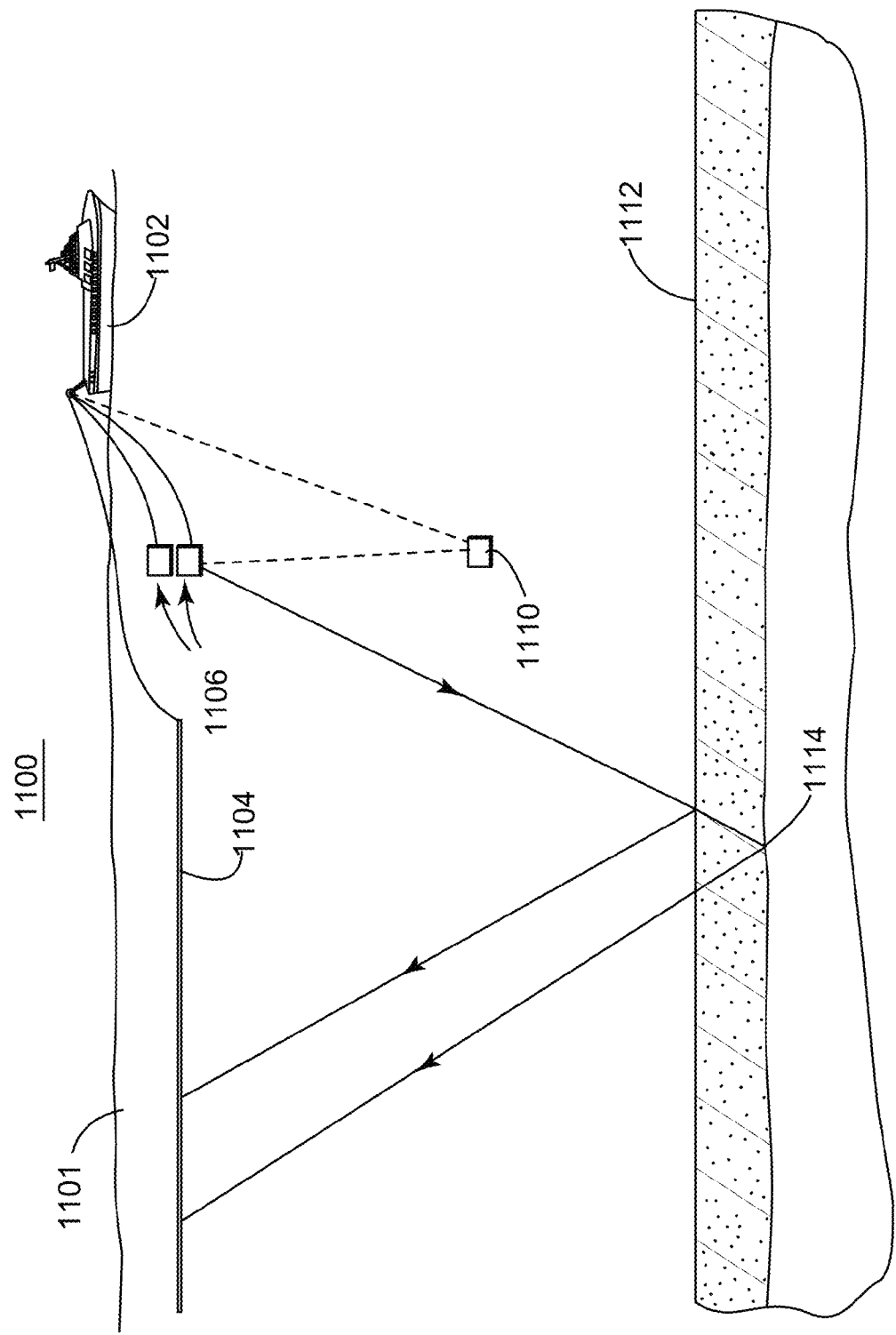
FIG. 11 is a seismic data acquisition system according to an embodiment.

The above-described methods and devices enable measurement of a source signature shot-by-shot. FIG. 11 illustrates a seismic data acquisition system 1100 that uses an AUV 1110 to measure source signature shot-by-shot. System 1100 includes a vessel 1102 that tows streamers 1104 (shown parallel to the water surface 1101, but may have any other profile, such as a depth-varying profile) and a source array 1106. Source array 1106 includes plural individual seismic sources (only two shown), such as air guns or vibrators, in a three dimensional arrangement. When source array 1106 is fired, seismic waves travel to AUV 1110 and to the seabed 1112. AUV 1110 determines the seismic signature based on the direct seismic waves received from source array 1106. The receivers on streamer 1104 detect seismic waves reflected from seabed 1112 and from interfaces such as 1114 under the seabed. AUV 1110 is configured to use acoustic signals exchanged with vessel 1102 and/or source array 1106 to maintain a position at a predetermined depth under source 1106. The detected source signature may be stored in a memory of the AUV or may be transmitted acoustically from the AUV to a data hub located, for example, on vessel 1102. Detecting a source signature during seismic surveys (i.e., while acquiring seismic data) enables processing the seismic data using the detected source signature.

FIG. 12 is a flowchart of a seismic data acquisition method 1200 according to another embodiment. Method 1200 includes towing a source array at 1210, and controlling an autonomous underwater vehicle (AUV) to maintain a position (at a predetermined depth) under the source array at 1220. Method 1200 further includes actuating the source array at 1230 and measuring a source signature of the source array using seismic receivers carried by the AUV at 1240. Method 1200 then includes detecting reflections emerging from a subsurface structure in response to actuating the source at 1250. Method 1200 then includes processing seismic data representative to the reflections using the source signature at 1260. Thus the source signature is monitored shot-by-shot while the seismic data acquisition system moves at production speed. This manner of simultaneously acquiring seismic data and source signature allows a shot-by-shot deconvolution of the seismic data to extract the surveyed substructure's response to the incident seismic energy.

Additionally, a currently measured source signature may be compared with a previously measured source signature to detect operative faults (e.g., air leaks, bad guns, etc.) of the source array in real-time. This real-time detection of faults provides the advantage of being able to promptly address the operative faults.

Figure 1:
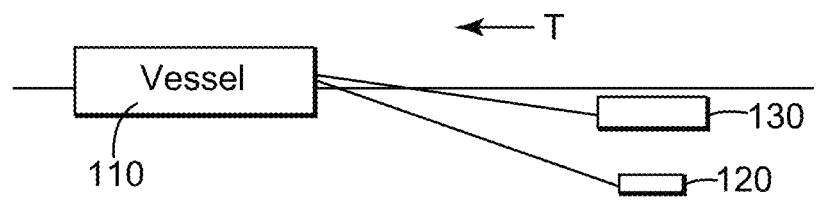
FIG. 1 illustrates a conventional method for measuring a source signature.
Figure 2:
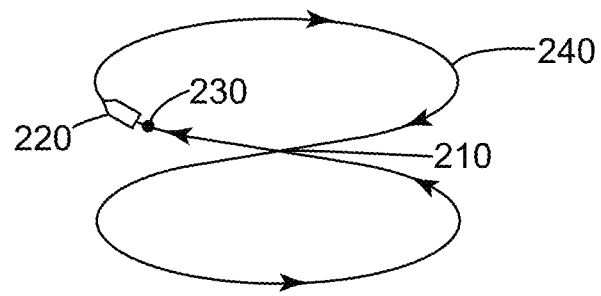
FIG. 2 illustrates another conventional method for measuring a source signature.

In contrast to the conventional setup for measuring a source signature in FIG. 1, the above-described embodiments avoid difficulties caused by the presence of another towing cable for deeply-located seismic detectors.

The disclosed embodiments provide methods, systems, and devices for measuring a source signature wirelessly (i.e., without having receivers towed using a wire/cable). It should be understood that this description is not intended to limit the invention. On the contrary, the exemplary embodiments are intended to cover alternatives, modifications, and equivalents, which are included in the spirit and scope of the invention as defined by the appended claims. Further, in the detailed description of exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in particular combinations, each feature or element may be used alone without the other features and elements of the embodiments, or in other various combinations with or without other features and elements disclosed herein.

The written description uses examples of the subject matter disclosed to enable any person skilled in the art to practice the same, including making and using the described devices or systems and performing any of the described methods. The patentable scope of the subject matter is defined by the claims, and may include other examples that occur to those skilled in the art. Such examples are intended to be within the scope of the claims.

What is claimed is:

1. A method for acquiring a source signature of a towed source array, the method comprising:
   towing the source array in water;
   deploying an autonomous underwater vehicle (AUV);
   controlling the AUV to maintain a position under the towed source array;
   detecting seismic waves emitted by the towed source array using seismic receivers carried by the AUV; and
   extracting the source signature based on the detected seismic waves.

2. The method of claim 1, wherein the AUV is controlled to follow the towed source array at a depth at least equal to 200 m during a seismic survey, the source signature being computed plural times during the seismic survey.

3. The method of claim 1, further comprising:
   converting the detected seismic waves into digital data.

4. The method of claim 1, further comprising:
   acoustically transmitting information related to the detected seismic waves from the AUV to a vessel, or
   storing the information related to the detected seismic waves in a data storage device located on the AUV.

5. The method of claim 1, wherein the controlling includes
   receiving position-related acoustic signals from a vessel, the position-related acoustic signals providing information about a current position of the towed source array relative to the vessel or including a command to adjust a trajectory of the AUV to maintain the position under the towed source array.

6. The method of claim 1, further comprising:
   determining the position of the AUV relative to the towed source array using an acoustic positioning system.

7. The method of claim 6, wherein the acoustic positioning system is an ultra-short baseline (USBL) system.

8. The method of claim 1, further comprising:
   steering the AUV to perform a loop around the towed source array, in a substantially horizontal plane.

9. The method of claim 8, wherein the loop is characterized by a distance from the AUV to the source array in a range from about 300 to about 500 m.

10. The method of claim 1, wherein the seismic receivers are hydrophones.

11. The method of claim 1, wherein the seismic receivers are attached to the AUV by cables.

12. The method of claim 1, wherein the AUV is equipped with a self-powered system.

13. The method of claim 1, further comprising:
monitoring a location of the source array, wherein the AUV is controlled based on the monitoring.

14. A seismic data acquisition method, comprising:
towing a source array;
controlling an autonomous underwater vehicle (AUV) to maintain a position under the source array;
actuating the source array;
measuring a source signature of the source array using seismic receivers carried by the AUV; and
detecting reflections emerging from a subsurface structure in response to actuating the source array with receivers located on a streamer.

15. The method of claim 14, further comprising:
analyzing seismic data related to the reflections detected by the receivers using the measured seismic signature.

16. The method of claim 14, further comprising:
acoustically transmitting information related to the measured seismic signature to a vessel, or
storing the information related to the measured seismic signature in a data storage device located on the AUV.

17. The method of claim 14, wherein the controlling of the AUV to maintain the position under the source array includes receiving position-related acoustic signals from a vessel, the position-related acoustic signals providing information about the position of the AUV or including a command to adjust a trajectory of the AUV to maintain the position under the source array.

18. The method of claim 14, wherein the position of the AUV is at least 200 m below the source array.

19. The method of claim 18, wherein the measured source signature is compared with a previously measured source signature to detect operative faults of the source array.

20. A method for acquiring a source signature of a source array, the method comprising:
towing the source array in water;
deploying an autonomous underwater vehicle (AUV) that uses acoustic signals to maintain a position under the source array while the source array is towed; and
extracting a source signature of the source array based on measurements acquired by one or more seismic receivers carried by the AUV.

* * * * *